Figure 1:
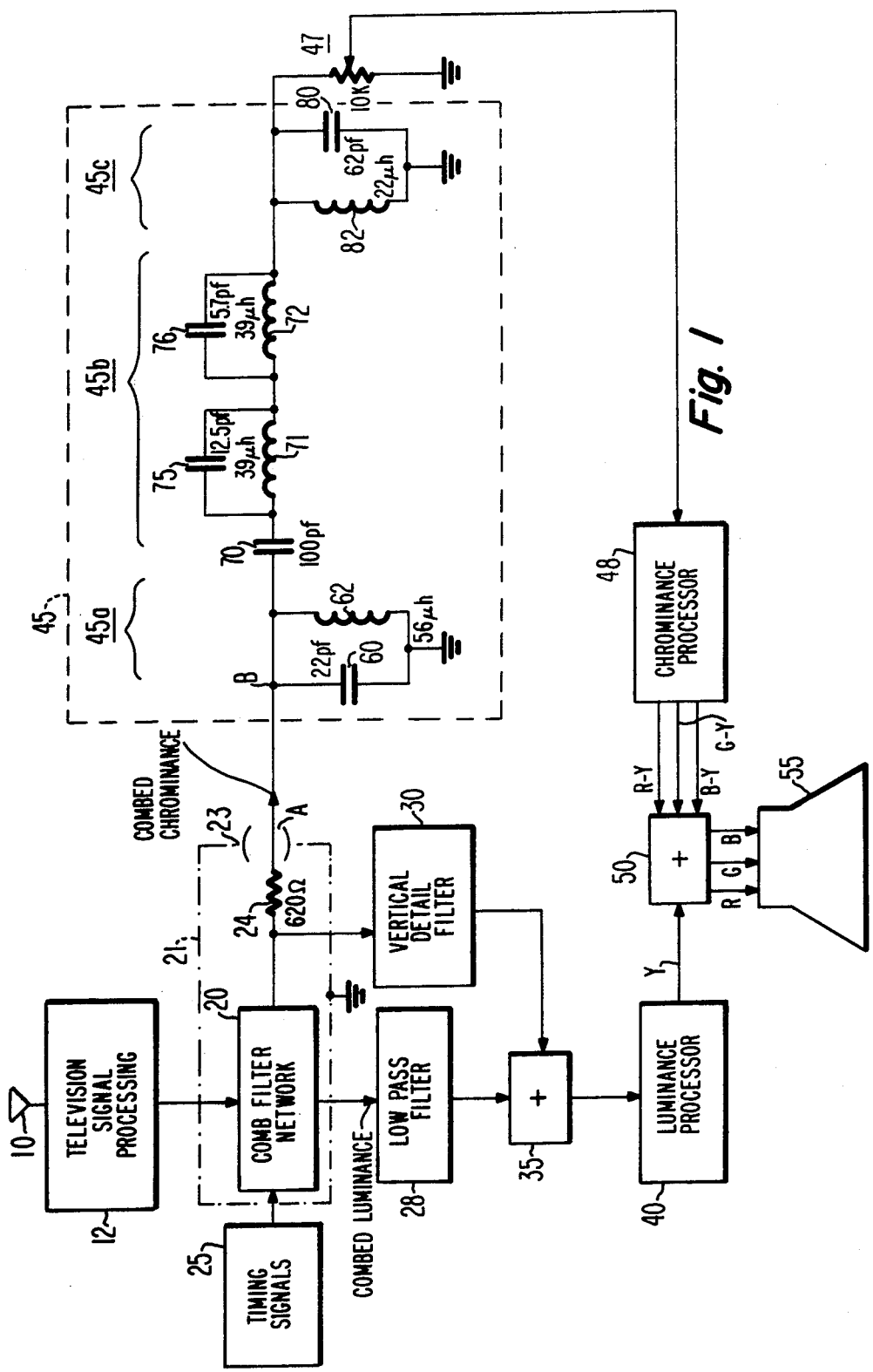

United States Patent [19]

Naimpally et al.

[11] Patent Number: 4,620,220
[45] Date of Patent: Oct. 28, 1986

[54] WIDEBAND CHROMINANCE SIGNAL FILTER

[75] Inventors: Saiprasad V. Naimpally; Wesley W. Murphy, III, both of Indianapolis, Ind.

[73] Assignee: RCA Corporation, Princeton, N.J.

[21] Appl. No.: 508,593

[22] Filed: Jun. 28, 1983

[51] Int. Cl.$^4$ .................... H04N 9/64; H04N 9/77
[52] U.S. Cl. .................... 358/40; 358/21 R; 358/31
[58] Field of Search .................... 358/40, 31, 21, 38, 358/23, 37, 27, 184; 333/175, 176; 455/339, 307

[56] References Cited

U.S. PATENT DOCUMENTS

| 4,288,811 | 9/1981 | Naimpally | 358/31 |
| 4,371,891 | 2/1983 | Yost | 358/31 |
| 4,417,270 | 11/1983 | Nagao et al. | 358/23 |
| 4,513,311 | 4/1985 | Hirai et al. | 358/40 |
| 4,516,153 | 5/1985 | Krull et al. | 358/31 |
| 4,536,787 | 8/1985 | Murphy, III et al. | 358/38 |
| 4,536,788 | 8/1985 | Naimpally | 358/38 |

OTHER PUBLICATIONS

Service Data Bulletin (No. T3, 1954) for RCA Color Television Receiver Model CT-100.

Primary Examiner—James J. Groody
Assistant Examiner—Michael P. Dunnam
Attorney, Agent, or Firm—P. J. Rasmussen; P. M. Emanuel; R. H. Kurdyla

[57] ABSTRACT

A color television receiver includes a comb filter responsive to detected video signals for providing a wideband combed chrominance signal, which is coupled to chrominance processing circuits via a composite filter including plural mutually interactive resonant sections. An input resonant section of the filter serves to remove very high frequency interference signals including comb filter switching components from the chrominance signal path, and also coacts with the other filter sections to provide an amplitude characteristic having a sense to compensate for an oppositely directed amplitude characteristic associated with the detected video signals, over the passband of the wideband chrominance signals.

8 Claims, 4 Drawing Figures

WIDEBAND CHROMINANCE SIGNAL FILTER

This invention concerns an electrical signal filter in a color television receiver system for imparting a prescribed amplitude characteristic to the chrominance component of the television signal prior to chrominance signal processing. In particular, the invention concerns such a filter in a system including provision for processing a wideband chrominance information component.

In a color television signal according to NTSC broadcast standards such as employed in the United States, the chrominance information component of a color television signal encompasses signal frequencies from approxmately 2.08 MHz to 4.08 MHz, between the 3 db points, in the modulated chrominance frequency spectrum. The frequency of the chrominance subcarrier reference signal, approximately 3.58 MHz, is situated in the upper frequency portion of the modulated chrominance frequency spectrum.

In "narrowband" chrominance signal processing, which is employed in many color television receiver systems, a narrow range of modulated chrominance signal frequencies are processed to extract the color information. Typically, such frequencies occupy a 1 MHz bandwidth centered about the 3.58 MHz chrominance subcarrier frequency (i.e., 3.58 MHz ±0.5 MHz). Narrowband chrominance processing has been found to be an acceptable, less complicated alternative under certain circumstances, compared to wideband chrominance processing.

"Wideband" processing of the chrominance component entails processing the full 2.08 MHz to 4.08 MHz modulated chrominance signal bandwidth. Wideband chrominance processing is particularly advantageous in high definition color television signal systems, such as color receivers employing comb filtering techniques for extracting the luminance and chrominance components from the composite color television signal prior to luminance and chrominance processing. With wide bandwidth chrominance processing, greater use can be made of the available color information content of the television signal, resulting in improved color picture definition and enhanced subjective color sharpness.

A choice of wideband or narrowband chrominance processing is often implemented by means of a wideband or narrowband bandpass filter inserted between the output of the video detector stage of the receiver, which follows the intermediate frequency (IF) stage of the receiver, and the chrominance signal processing circuits of the receiver. The response of the IF stage is sometimes such that IF output signals, as supplied to the video detector, exhibit a decreasing amplitude slope with respect to modulated chrominance signal frequencies. This IF amplitude response characteristic must be compensated for before subjecting the modulated chrominance component to processing by the chrominance processing circuits of the receiver. The chrominance bandpass filter which precedes the chrominance processing circuits is a convenient place to provide such compensation.

It is herein recognized that such compensation should produce a relatively flat amplitude characteristic over the frequency range of the wideband chrominance component, as well as a substantially symmetrical amplitude characteristic over a narrower range of chrominance signal frequencies centered about the chrominance subcarrier frequency in the upper portion of the wideband chrominance frequency range. It is furthermore recognized as desirable to use an uncomplicated, economical chrominance bandpass filter to achieve these results. These objectives are satisfied by a chrominance bandpass filter disclosed herein in accordance with the principles of the present invention.

The disclosed bandpass filter receives input chrominance signals including a subcarrier component at a frequency unsymmetrically disposed in the range of frequencies occupied by the chrominance signal. The input chrominance signal exhibits a decreasing amplitude slope with respect to frequencies in the chrominance signal frequency range. The bandpass filter exhibits a passband wherein the chrominance subcarrier frequency is unsymmetrically disposed therein. The bandpass filter imparts to the chrominance signal an amplitude characteristic with an oppositely directed, increasing amplitude slope to compensate for the decreasing amplitude slope associated with the input chrominance signals. Output chrominance signals from the bandpass filter exhibit substantially equal amplitudes at the end frequency extremes of the wideband chrominance signal frequency range, a relatively flat amplitude characteristic over the wideband chrominance frequency range, and a substantially symmetrical amplitude characteristic over a narrower range of chrominance signal frequencies centered about the chrominance subcarrier frequency in the upper portion of the wideband chrominance frequency range.

In accordance with a feature of the invention, the chrominance signals received by the bandpass filter are derived from a composite video signal by means of a comb filter which responds to switching signals. An input resonant section of the bandpass filter includes a capacitance for suppressing high frequency signals such as may be associated with the switched operation of the comb filter. The resonant input section also coacts with other resonant sections of the bandpass filter to produce a peaked filter amplitude response.

Figure 2:
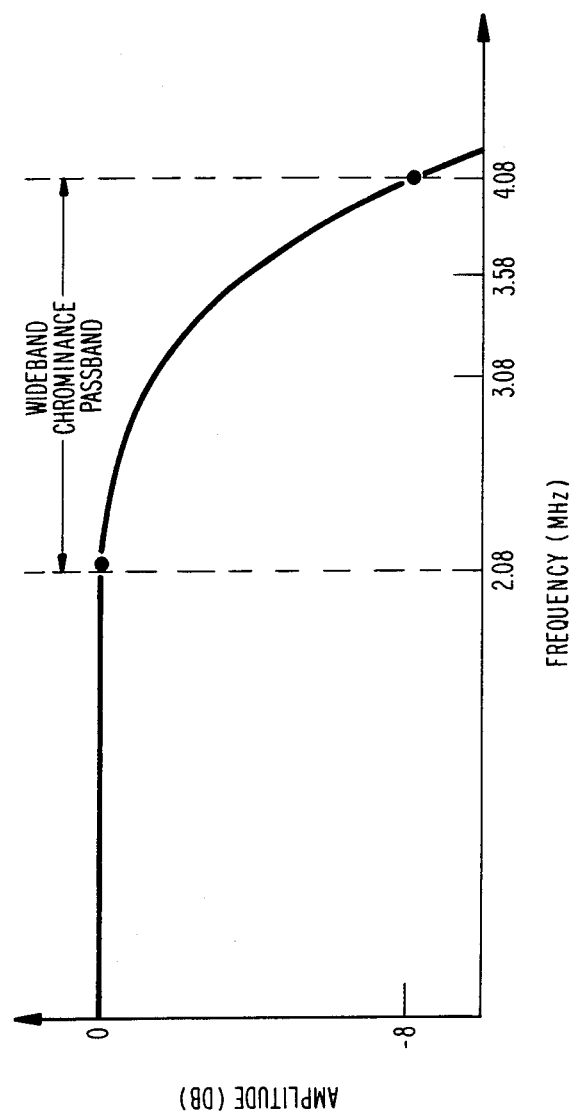
Figure 3:
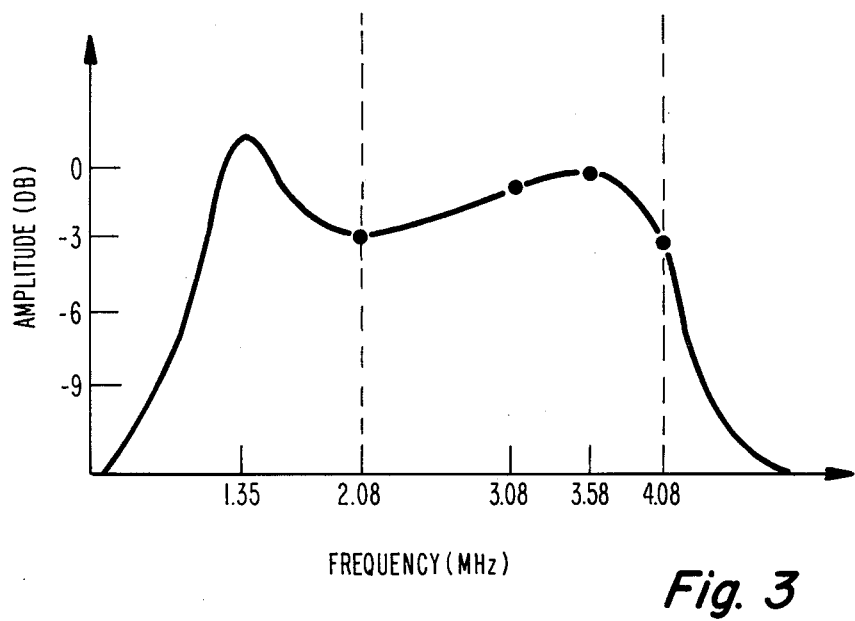
Figure 4:
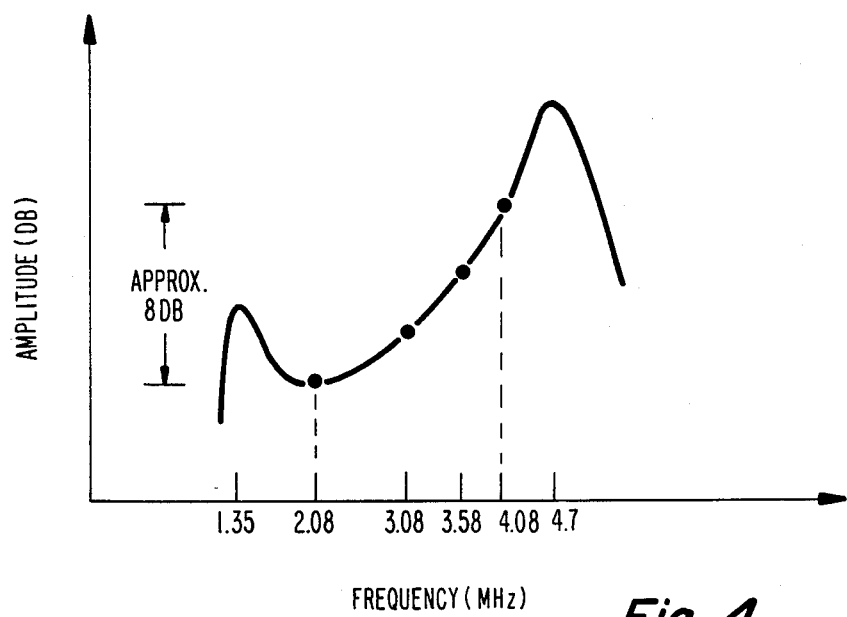

In the drawing:

FIG. 1 shows a portion of a color television receiver including a bandpass filter network in accordance with the principles of the present invention; and FIGS. 2-4 depict amplitude-versus-frequency characteristics helpful in understanding the operation of the filter network shown in FIG. 1.

In FIG. 1, broadcast color television signals including image representative luminance and chrominance components are received by an antenna 10 and applied to a television signal processing network 12 of the receiver. Network 12 includes radio frequency and intermediate frequency (IF) signal processing stages, and a video detector stage responsive to the IF signals. Detected video signals from network 12, including luminance an chrominance components, are applied to an input of a comb filter network 20. In this example comb filter 20 comprises charge coupled devices and can be of the type shown in U.S. Pat. No. 4,096,516 for example. In comb filter 20 signal charge packets are transferred (i.e., switched) from stage to stage in response to timing signals from a source 25. The timing signals have a frequency of 10.7 MHz, which corresponds to the third harmonic frequency of the 3.58 MHz chrominance subcarrier frequency. Comb filter network 20 is contained within a grounded conductive enclosure 21 which serves as a shield to suppress radiation of radio frequency interference (RFI) signals such as can be generated by the rapid amplitude transitions of the comb filter switching signals.

A "combed" luminance signal from a first signal output of comb filter 20 is coupled via a low pass filter 28 to an input of a signal combining network 35. Filter 28 is arranged to pass luminance signal frequencies from DC to approximately 4.0 MHz, and serves to remove noise and switching frequency components of the timing signals associated with the switching operation of comb filter 20.

A "combed" chrominance signal from a second signal output of comb filter 20 is applied to a low pass vertical detail filter 30. Filter 30 exhibits an upper cutoff frequency of approximately 1.5 MHz, and selectively passes those signal frequencies present in the second signal output of comb filter 20 which lie below this cut-off frequency. Signal frequencies in this region represent vertical detail luminance information which is absent from the combed luminance signal nd which must be restored to the combed luminance signal to avoid loss of vertical image resolution in the luminance content of a displayed image. Such vertical detail resolution is accomplished by combining, in combiner 35, an appropriate amount of the vertical detail signal from filter 30 with the filtered combed luminance signal from filter 28. The output signal from combiner 35 corresponds to a reconstituted luminance component of the color television signal, which is afterwards applied to a luminance signal processor 40.

Combed chrominance signals from the second output of comb filter 20 are also coupled, via a resistor 24 and a conductor which passes through an aperture A in shielded enclosure 21, to a wideband chrominance bandpass filter 45 according to the present invention as will be discussed subsequently. Output signals from bandpass filter 45 are coupled via a pre-set potentiometer 47 to a wideband chrominance signal processor 48 for providing R-Y, G-Y and B-Y color difference signals. Chrominance processor 48 includes gain and phase control networks, a controlled local oscillator for regenerating a 3.58 MHz color subcarrier reference signal, synchronous "I" and "Q" chrominance signal demodulators, and I and Q demodulator filter networks e.g., of the type discussed in copending U.S. pat. application Ser. No. 488,813 of S. V. Naimpally, titled "Demodulated Chrominance Signal Filter Using Impedance Mismatched Sections", now U.S. Pat. No. 4,536,788. The luminance output signal (Y) from processor 40 and the color difference signals from processor 48 are combined in a matrix amplifier 50 for providing R, G, B color image representative signals which are suitably coupled to image intensity control electrodes of a color kinescope 55.

The combed chrominance signal as applied to chrominance bandpass filter 45 includes mutually quadrature phased "I" and "Q" signal modulation components. In a color television signal processing system according to NTSC broadcast standards such as employed in the United States, the Q chrominance signal modulation component occupies an approximately 0.5 MHz bandwidth on both upper and lower sidebands symmetrical with respect to the 3.58 MHz frequency of the chrominance subcarrier signal. Thus in the modulated chrominance frequency spectrum the Q chrominance information includes signal frequencies from 3.08 MHz to 4.08 MHz. The I chrominance signal modulation component occupies an approximately 1.5 MHz bandwidth on a lower sideband relative to the chrominance subcarrier frequency, and occupies a 0.5 MHz bandwidth on an upper sideband relative to the chrominance subcarrier signal frequency. Thus in the modulated chrominance frequency spectrum the I chrominance information includes signal frequencies from 2.08 MHz to 4.08 MHz. This range of signal frequencies also corresponds to the range of signal frequencies encompassed by the wideband chrominance signal, and will hereinafter be referred to as the wideband chrominance signal passband.

In many color television receivers the detected video signal from network 12 exhibits significant attenuaton of the chrominance signal amplitude over a significant portion of the chrominance passband, typically due to the characteristics of the IF stage. This effect is illustrated by FIG. 2 which shows the amplitude-versus frequency characteristic for signals applied to filter 45, and is substantially compensated for by means of composite bandpass filter 45 before the chrominance signal is subjected to processing in processor 48.

Filter 45 comprises an input resonant section 45a, an intermediate resonant section 45b, and an output resonant section 45c all of which are mutually interactive. Chrominance signals are applied to input section 45a via a low impedance output of network 20 (e.g., via an emitter follower transistor stage associated with network 20), and resistor 24. Output chrominance signals from filter 45 are applied to a high impedance input of chrominance processor 48.

Referring to FIG. 3 for the moment, there is shown the amplitude-versus-frequency response characteristic of output signals from bandpass filter 45 as incorporated in the receiver. Output chrominance signals from filter 45 vary in amplitude by slightly less than 3 db over the chrominance passband from 2.08 MHz to 4.08 MHz, which is acceptable with respect to the signal processing requirements of chrominance processor 48. Chrominance signals at the 2.08 MHz and 4.08 MHz end frequencies of the wideband chrominance passband are substantially equal in amplitude. Out-of-band signal frequencies above 4.08 MHz are highly attenuated.

As seen from FIG. 3, the 3.58 MHz chrominance subcarrier frequency is situated in the upper frequency portion of the chrominance passband, and is thus nonsymmetrically disposed in the chrominance passband. The amplitude response produced by filter 45 at 3.58 MHz ±0.5 MHz is approximately symmetrical, with the amplitude response at 3.08 MHz being approximately −1 db down relative to 3.58 MHz, and the amplitude response at 4.08 MHz being approximately −2 db down relative to 3.58 MHz. Amplitude symmetry in this frequency range is desirable with respect to the demodulation of the symmetrically double sidebanded Q component of the chrominance signal, which in the modulated chrominance frequency spectrum occupies a frequency range from 3.08 MHz to 4.08 MHz.

FIG. 4 illustrates the amplitude-versus-frequency response of bandpass filter 45 alone. As seen from FIG. 4, filter 45 exhibits an approximately 8 db rising amplitude characteristic over the chrominance passband from 2.08 MHz to 4.08 MHz.

Returning to FIG. 1, input section 45a of filter 45 comprises a parallel resonant LC circuit including a capacitor 60 and an inductor 62 shunting the input chrominance signal path. Capacitor 60 and inductor 62 exhibit a resonant frequency of 4.53 MHz, above the chrominance passband. As will be discussed subsequently, the input resonant circuit including capacitor 60 and inductor 62 is included to assure that the overall filter response exhibits a rising amplitude characteristic over most of the chrominance passband to compensate for the declining amplitude characteristic manifested by signals applied to filter 45 from preceding stages. This is accomplished by the coaction of circuit 60,62 with the complex impedance manifested by the remainder of bandpass filter 45. In addition, capacitor 60 of the input section forms a low pass filter with series input resistor 24 to suppress very high frequency radio frequency interference (RFI) signals generated by the switching action of comb filter 20, as will also be discussed.

Intermediate section 45b comprises a series resonant LC circuit including a capacitor 70 and inductors 71,72 in series with the signal path. Capacitor 70 and inductors 71,72 exhibit a resonant frequency of approximately 1.8 MHz, below the chrominance passband. A capacitor 75 coacts with inductor 71 to form a parallel resonant trap at 7.2 MHz (the second harmonics of the chrominance subcarrier frequency). Capacitor 76 and inductor 72 coact to form a parallel resonant trap at 10.7 MHz (the third harmonic of the chrominance subcarrier frequency). Capacitors 75 and 76 have substantially no effect upon the bandpass filter response at the relatively lower frequencies within the chrominance passband.

Output section 45c comprises a parallel resonant LC circuit including a capacitor 80 and an inductor 82 shunting the output chrominance signal path. Capacitor 80 and inductor 82 exhibit a resonant frequency of approximately 4.3 MHz, above the chrominance passband.

Thus sections 45a, 45b and 45c are each resonant at a frequency outside of the chrominance passband. Since greater delay is experienced at resonant frequencies, setting the resonant frequencies of the respective filter sections outside of the chrominance passband prevents such otherwise experienced greater delay from impairing the overall delay response of the composite bandpass filter.

Mutual coupling between the parameters of the filter sections occurs because the filter sections are not isolated from one another. Thus, for example, sections 45b and 45c coact somewhat such that section 45b exhibits an effective resonant frequency of approximately 1.6 MHz, and section 45c exhibits an effective resonant frequency of approximately 4.7 MHz, both frequencies shifted slightly from the individal resonant frequencies of these sections as mentioned previously. However, these shifted resonant frequencies remain outside of the chrominance passband. An amplitude peak produced at approximately 4.7 MHz, as shown in FIG. 4, results from the coaction of filter sections 45b and 45c.

Capacitor 60 and inductor 62 of input section 45a coact with the complex impedance presented by filter sections 45b and 45c to produce a peaked amplitude response at approximately 1.35 MHz, as shown in FIGS. 3 and 4. That is, the previously mentioned low end resonant frequency of 1.6 MHz is shifted downward to 1.35 MHz. This peaked amplitude response desirably yields a rising amplitude characteristic over the entire wideband chrominance passband encompassing 2.08 MHz to 4.08 MHz, as shown in FIG. 4. Such rising amplitude characteristic assists to provide suitable compensation for the decreasing amplitude response manifested by the input signals applied to filter 45 (FIG. 2) due to the IF signal processing characteristics of signal processor 12 over the wideband chrominance passband. The overall amplitude response of signals from filter 45 in the system of FIG. 1 consequently exhibits an acceptably flat amplitude characteristic over the wideband chrominance passband, as indicated by FIG. 3. As noted previously, amplitude symmetry in the frequency range of 3.58 MHz ±0.5 MHz also advantageously results.

Capacitor 60 of the input section also forms a low pass filter with input resistor 24 to suppress very high frequency RFI signals generated by the switching action of comb filter 20, as follows.

Resistor 24 is enclosed by metallic enclosure 21 which shields comb filter 20. Capacitor 60 is located external to, but in close physical proximity with, a planar surface 23 of enclosure 21 from which signals emerge via resistor 24 and an output aperture A. Capacitor 60 comprises a ceramic disc capacitor with a ceramic wafer dielectric located between a positive or "hot" conductive planar plate connected to a node "B", and a negative (less positive) conductive planar plate coupled to the same source of ground reference potential as enclosure 21. The "hot" plate of capacitor 60 is situated substantially in parallel with and facing surface 23 of enclosure 21.

Without capacitor 60, the portion of the conductor which couples resistor 24 to node B outside of enclosure 21 would act as an antenna for RFI energy, radiating this energy to nearby circuits. However, capacitor 60 prevents this radiation by conducting a portion of the RFI energy through the capacitor dielectric to the grounded plate of capacitor 60. The balance of the RFI energy at node B and at the connections to this node is radiated from the surface of the positive or "hot" plate of capacitor 60 toward surface 23. The RFI energy radiated from the positive plate is narrowly confined to the area between capacitor 60 and surface 23, and is returned to ground via enclosure 21. In essence, the positive plate of capacitor 60 and the facing portion of surface 23 comprise an air-dielectric capacitance for bypassing the RFI energy from the signal path. Thus the arrangement of capacitor 60 acts as a low impedance bypass for most of the RFI energy at node B, conducting it harmlessly to ground.

This mechanism eliminates RFI radiation of very high frequency components such as are associated with the rapid amplitude transitions of the 10.7 MHz comb filter switching signals including higher harmonics of such switching signals. Such very high frequency components extend through the IF, VHF and UHF bands of the radio frequency spectrum, and can intermodulate with received television signals to cause severe picture beat patterns on several television channels. Additional details of this RFI suppression technique are found in U.S. Pat. No. 4,267,528 of G. E. Thornberry, titled "Radio Frequency Interference Suppression Apparatus.

Thus capacitor 60 advantageously serves both as a low pass RFI filter element for suppressing switching transients from comb filter 20, as well as comprising a part of bandpass filter 45 for providing the desired wideband chrominance amplitude-versus-frequency characteristic as described.

What is claimed is:

1. In a system for processing a video signal including a wideband chrominance signal component comprising a chrominance subcarrier component exhibiting a frequency unsymmetrically disposed in the range of frequencies occupied by said chrominance signals, apparatus comprising:

a source of video signals exhibiting an amplitude chacteristic with a decreasing slope over a frequency range including frequencies associated with said wideband chrominance component;

comb filter means responsive to said video signals and to switching signals for deriving said wideband chrominance component from said video signal, said derived chrominance component exhibiting said amplitude characteristic of decreasing slope; and filter means responsive to said derived wideband chrominance signals and exhibiting a passband wherein said chrominance subcarrier frequency is unsymmetrically disposed in said passband, for providing output chrominance signals in accordance with the amplitude-versus-frequency response of said filter means; wherein said filter means imparts to said chrominance signals an amplitude characteristic with an increasing slope for substantially compensating for said amplitude characteristic with said decreasing slope;

said filter means comprises an input resonant section including a capacitance for suppressing high frequency signals above the range of chrominance signal frequencies;

a resistance couples said derived chrominance signals to said input section of said filter means, said resistance forming a low pass filter with said capacitance;

said filter means comprises plural mutually interactive resonant sections including said input section;

said input section comprises an inductance arranged as a parallel resonant circuit with said capacitance; and said input section coacts with other of said plural resonant sections to produce a peaked filter amplitude response at a frequency below said range of chrominance signal frequencies.

2. In a system for processing a video signal including a wideband chrominance signal component comprising a chrominance subcarrier component exhibiting a frequency unsymmetrically disposed in the range of frequencies occupied by said chrominance signals, apparatus comprising:

a source of video signals exhibiting an amplitude characteristic with a decreasing slope over a frequency range including frequencies associated with said wideband chrominance component;

means for deriving said wideband chrominance component from said video signal, said derived chrominance component exhibiting said amplitude characteristic of decreasing slope; and filter means responsive to said derived wideband chrominance signals and exhibiting a passband wherein said chrominance subcarrier frequency is unsymmetrically disposed in said passband, for providing output chrominance signals in accordance with the amplitude-versus-frequency response of said filter means; wherein said filter means imparts to said chrominance signals an amplitude charcteristic with an increasing slope for substantially compensating for said amplitude characteristic with said decreasing slope; and said filter means comprises plural mutually interactive resonant sections including an input resonant section; an output resonant section; and an intermediate resonant section coupling said input section to said output section.

3. Apparatus according to claim 2, wherein said input section comprises a capacitive input network.

4. Apparatus according to claim 2, wherein said input, output and intermediate resonant sections are individually tuned to frequencies outside of said range of chrominance signal frequencies.

5. Apparatus according to claim 4, wherein said input and output resonant sections are individually tuned to frequencies above said range of chrominance signal frequencies; and said intermediate resonant section is individually tuned to a frequency below said range of chrominance signal frequencies.

6. Apparatus according to claim 5, wherein said input resonant section coacts with said intermediate and output resonant sections to produce a peaked filter amplitude response at a frequency below said range of chrominance signal frequencies.

7. Apparatus according to claim 2, wherein said input section comprises a parallel resonant inductance-capacitance network coupled in shunt with the chrominance signal path;

said intermediate section comprises a series resonant inductance-capacitance network coupled in series with the chrominance signal path; and said output section comprises a parallel resonant inductance-capacitance network coupled in shunt with the chrominance signal path.

8. Apparatus according to claim 7, wherein said intermediate section comprises plural inductances each respectively associated with a capacitance for providing plural traps with respect to harmonic frequencies of said frequency of said chrominance subcarrier.

* * * * *